No. 725,092. PATENTED APR. 14, 1903.
J. F. KELLY & C. C. CHESNEY.
ALTERNATING CURRENT APPARATUS.
APPLICATION FILED NOV. 10, 1900.
NO MODEL. 4 SHEETS—SHEET 1.
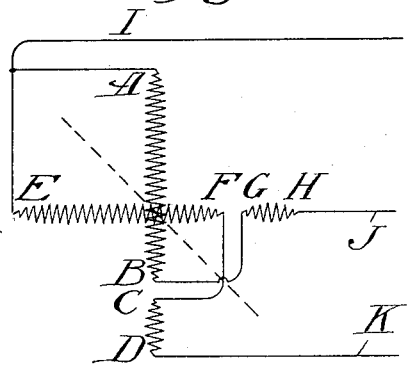
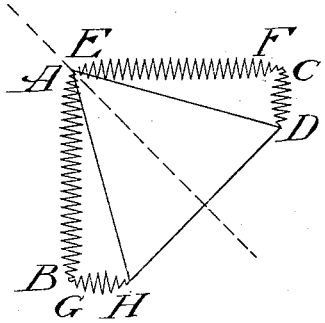
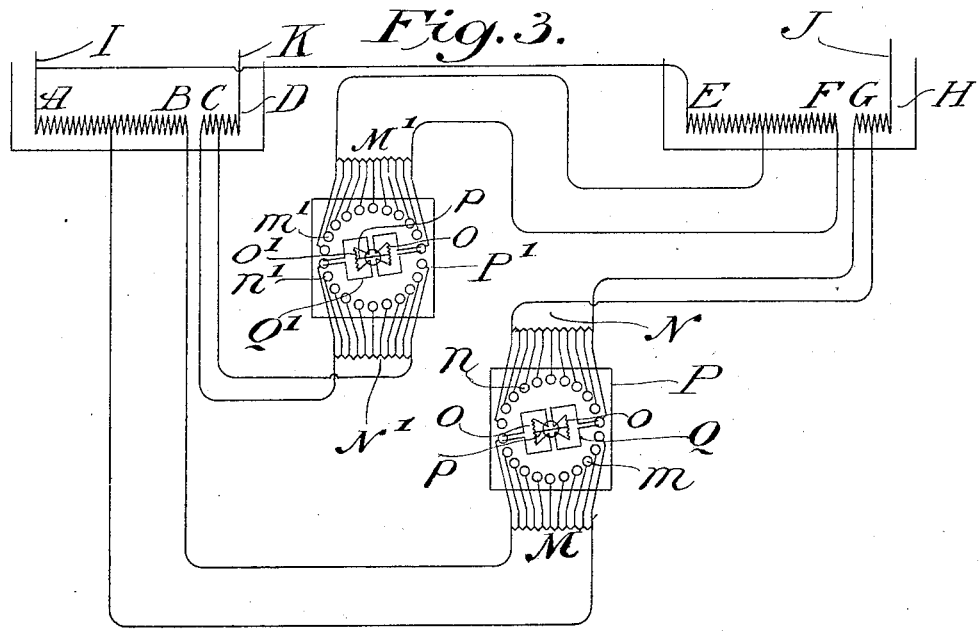
WITNESSES:
George T. Hackley
Rob't S. Allyn
INVENTORS
John F. Kelly.
Cummings C. Chesney.
BY
ATTORNEY

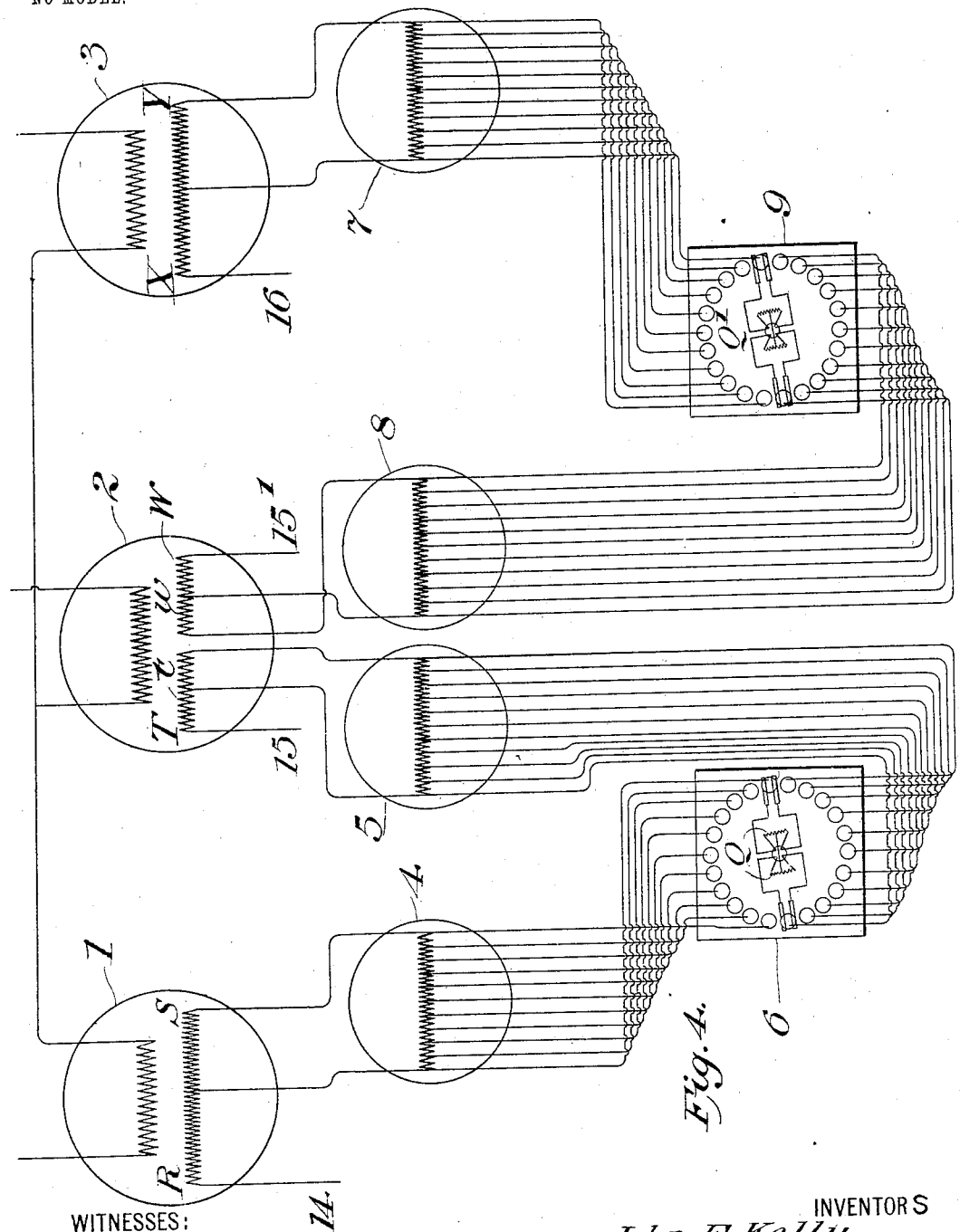

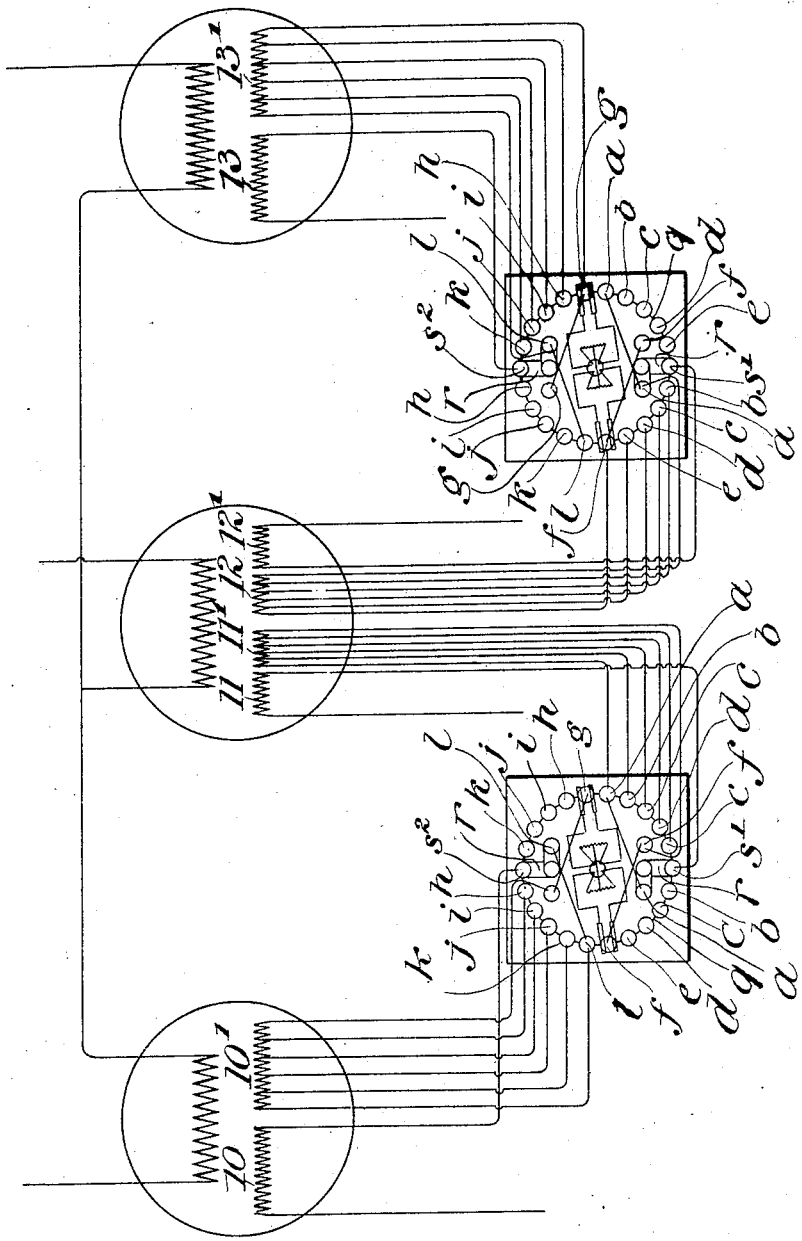

No. 725,092. PATENTED APR. 14, 1903.
J. F. KELLY & C. C. CHESNEY.
ALTERNATING CURRENT APPARATUS.
APPLICATION FILED NOV. 10, 1900.
NO MODEL. 4 SHEETS—SHEET 4.
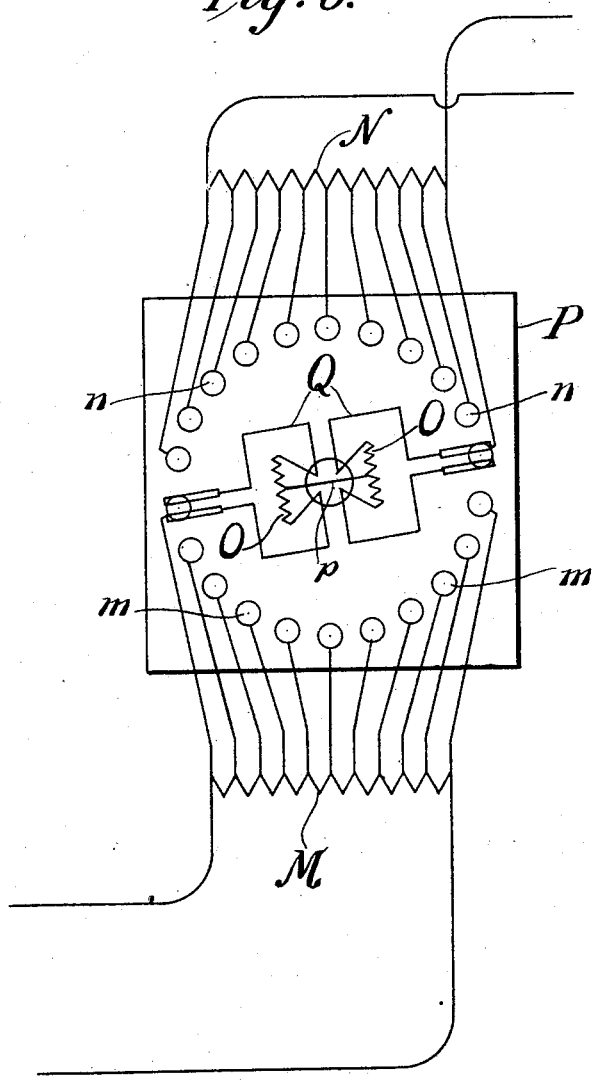
WITNESSES:
Geo. V. Rasmussen
Rob. S. Allyn
INVENTORS
John F. Kelly
Cummings C. Chesney
BY
R. C. Mitchell
ATTORNEY

UNITED STATES PATENT OFFICE.

JOHN F. KELLY AND CUMMINGS C. CHESNEY, OF PITTSFIELD, MASSACHUSETTS, ASSIGNORS TO STANLEY ELECTRIC MANUFACTURING COMPANY, OF PITTSFIELD, MASSACHUSETTS, A CORPORATION OF NEW JERSEY.

ALTERNATING-CURRENT APPARATUS.

SPECIFICATION forming part of Letters Patent No. 725,092, dated April 14, 1903.

Application filed November 10, 1900. Serial No. 36,042. (No model.)

*To all whom it may concern:*

Be it known that we, JOHN F. KELLY and CUMMINGS C. CHESNEY, citizens of the United States, residing at Pittsfield, Massachusetts, have invented certain new and useful Improvements in Alternating-Current Apparatus, of which the following is a full, clear, and exact description.

Our invention relates to improvements in alternating-current apparatus, and has for its object the production and regulation of currents of different phase, said currents being due to resultant electromotive forces whose components are of different phase. It is applicable to alternators and to secondary generators or transformers, as will be hereinafter pointed out.

By our invention any induced circuits, such as those of a two-phase alternator or the secondaries of two transformers supplied with two-phase currents, can be combined so as to produce three-phase currents, and the currents produced from combined electromotive forces can be regulated without disturbing their phase relations.

The invention so far as it relates to regulation is applicable to all cases in which currents of one phase are produced by the combination of electromotive forces having other phase relations, as will be hereinafter shown.

The following is a description of our invention, reference being had to the accompanying drawings, in which—

Figure 1 represents diagrammatically the induced circuits of either an alternator or of two transformers having electromotive forces displaced by ninety degrees. Fig. 2 is a diagram showing the resultant electromotive forces due to a combination of the electromotive forces of Fig. 1. Fig. 3 represents the coils of Fig. 1 provided with means for regulating the resultant electromotive forces and currents without disturbing their phase relations. Fig. 4 represents a similar means of regulation applied to apparatus wherein electromotive forces of three phases are combined to supply two-phase electromotive forces. Fig. 5 represents a modification of the means used in Figs. 3 and 4. Fig. 6 is an enlarged detail view of one of the elements.

Referring more particularly to the drawings, A B and C D represent two induced coils of one phase and E F and G H the induced coils of a second phase displaced by ninety degrees from that of A B and C D, A B being equal to E F and C D to G H, all being symmetrically arranged in their time relations. We have discovered that such being the case we can, by making C D and G H equal to .258 of A B and E F and connecting the inner end of A B with the inner end of G H and the inner end of E F with the inner end of C D and the two outer ends of A B and E F to the main I and the outer ends of G H and C D to mains J and K, obtain three resultant electromotive forces AH, ED, and DH, Fig. 2, which will result in three-phase currents when the circuits across the mains are completed. In this way apparatus in which the electromotive forces are displaced by ninety degrees can be easily altered to produce three-phase currents and the range and flexibility of a two-phase system extended and increased.

In order to vary or regulate the potential of the currents of different phase in such a system without introducing disturbance and distortion of phase relations, it is necessary to vary proportionally all the component electromotive forces which go to make up the resultant electromotive forces, and part of our invention consists of means for this purpose, one form of which is shown in Fig. 3. In this figure proportional parts of the main and auxiliary coils A B and G H are connected through two transformers M and N, respectively, to contacts n n on the switchboard P, and proportional parts of the main and auxiliary coils E F and C D are connected through transformers M' N', respectively, to contacts m' n' on the switchboard P', as shown. Switch-arms Q Q' connect diametrically opposite contacts on the respective boards. The transformers M N and M' N' are tapped at an equal number of points, the divisions in any one transformer being equal. When the switch-arms Q Q' are in the position shown, the circuit passes from the inner end of the coil A B to the inner end of the coil G H directly and the other from the inner end of E F to the inner end of C D. If, however, the contact-arms are turned toward the vertical position, the circuits will pass through the transformers M N and M' N', which will result in decreasing proportionally the effective electromotive forces of A B and G H by reason of the opposing actions of the transformers M and N and also in decreasing proportionally the effective electromotive forces of E F and C D by reason of the opposing actions of the transformers M' N'. By moving the arms Q Q' equal distances the resultant electromotive forces and current can be varied without in any way disturbing their phase relations, since the necessary condition is maintained—namely, the main coils are equal and also the auxiliary coils—and when any one is varied all are varied proportionally.

When the switch-arms have been turned so as to rest on the last contacts, those which are connected directly with the induced circuits of the generator without passing through the transformers M N and M' N', they cut out proportionate parts of the main and auxiliary induced circuits, and if intermediate regulation were not desired the transformers M N and M' N' might be dispensed with. If dispensed with, intermediate regulation could still be obtained by tapping the induced circuits at intermediate points and connecting directly to the switch-contacts, as in Fig. 5.

The switch-arms Q Q' are designed to lessen disturbance and sparking that might be caused in changing from one contact to another. They are made up of two parts, each consisting of two fingers connected together through self-induction coils O O and O' O', respectively, the centers of the two coils on each switch-arm being connected by a conductor $p$. When the two fingers of one end are on a single contact, the current flows through the coil from both ends to the center, resulting in a neutralization of its self-induction. When one finger does not engage with any contact, the current flows through the other only, being slightly affected by the self-induction coil. When the two fingers are on separate contacts, a short-circuit is prevented by the induction of the coil without interfering with the circuit from one end of the arm to the other. The changes are therefore gradual, and though the circuit is never broken there is no short-circuiting. One of these switches is shown enlarged in Fig. 6.

In applying the foregoing means of regulation to apparatus whereby resultant two-phase electromotive forces are obtained by combining three-phase electromotive forces similar principles are involved. Fig. 4 represents such an arrangement. 1, 2, and 3 are three transformers whose primaries are supplied with three-phase currents. R S, T W, and X Y are the three secondaries, having three-phase electromotive forces. The secondary T W is divided, so as to consist of two parts $t\ w$, each of which is .366 of R S or X Y, so that the effective electromotive force of the part $t$ is .366 of that of R S and that of part $w$ is .366 of X Y. When this is the case and the parts are arranged as shown, the resultant electromotive forces due to R S and $t$ and X Y and $w$ are displaced by ninety degrees. In order that the resultant electromotive forces may be varied without disturbing their phase relations, the effective electromotive forces of the component parts must all be varied, so that the proportion .366 shall be maintained. We do this by tapping the main and auxiliary induced circuits and connecting proportional parts thereof—to wit., of R S and $t$ to two transformers 4 and 5, which are connected to a switchboard 6, as in Fig. 3, and X Y and $w$—to other similar transformers and board 7, 8, and 9. In this case also moving the switch-arms Q Q' equal distances varies proportionately the effective component electromotive forces which go to make up the resultant electromotive forces, and hence varies the resultant electromotive forces without affecting their phase relations. The same result can be accomplished by connecting the main and auxiliary induced coils 10 10' 11 11' 12 12' 13 13' directly to a switch, so that a movement of the switch will cut out or in small proportionate parts of the two coils which furnish the phase-differing electromotive forces which are the components of either of the desired resultants, as in Fig. 5. In the switches of this Fig. 5 contacts having like letters are connected by the strands of the cable $q$, and bell-crank switches $r$ are provided which swing so as to connect $s'$ with either $a$ or $f$ and $s^2$ with either $g$ or $l$, by which means parts 10' 11' 12' 13' of the main and auxiliary coils can be reversed, thus extending the range through which the component and resultant electromotive forces can be varied.

Our invention will admit of other modifications and constitutes an excellent regulating generating apparatus.

The induced circuits furnishing the component electromotive forces may be in all cases either those of dynamo generators (alternators) or secondary generators, (transformers.) In either case the same connections will produce the same resultants, both as to phases and regulation.

What we claim is—

1. The combination with two main induced generator-circuits having electromotive forces displaced by ninety degrees of two auxiliary induced circuits acting respectively, one with each of said main induced circuits to produce electromotive forces of other phase displacement.

2. The combination with two main induced circuits of two auxiliary induced circuits connected therewith respectively, the electromotive forces of directly-connected circuits being displaced by ninety degrees and acting to produce resultant electromotive forces of other phase displacement.

3. The combination of two main induced circuits having electromotive forces displaced by ninety degrees of two auxiliary induced circuits connected to the main circuits, one to each main circuit respectively, and displaced by ninety degrees from the mains to which they are connected, the electromotive forces of the main and auxiliary induced circuits constituting components of three-phase electromotive forces.

4. The combination of a main and an auxiliary circuit having electromotive forces of different phase coacting to produce a resultant electromotive force differing in phase from either component and means for neutralizing proportionately the component electromotive forces.

5. The combination of induced main and auxiliary circuits producing resultant electromotive forces differing in phase from their components, of means for varying proportionately the effective electromotive forces of the components which make up said resultants.

6. In combination main and auxiliary induced circuits having electromotive forces coacting to produce resultant electromotive forces differing in phase from their components, said main and auxiliary circuits being divided proportionately, and means for neutralizing to a greater or less extent the electromotive forces of the divided portions.

7. In combination, main and auxiliary induced circuits having electromotive forces coacting to produce resultant electromotive forces differing in phase from their components, and means for cutting out of circuit proportionate parts of said main and auxiliary circuits for the purpose of regulating said resultant electromotive forces without distorting the phase relations of the resultant electromotive forces.

8. In a switch the combination of two self-induction coils electrically directly connected together at their centers, contact-fingers separately connected to the outside terminals of said coils, and series of contact-plates engaged by said fingers and arranged so that the spaces between any two plates are greater than that occupied by the contact device attached to one end of an induction-coil and less than that occupied by the contact devices attached to both ends thereof.

JOHN F. KELLY.
CUMMINGS C. CHESNEY.

Witnesses:
V. W. BERGENTHAL,
M. LOUISE NICHOLS.